United States Patent [19]

Kato

[11] Patent Number: 4,774,605
[45] Date of Patent: Sep. 27, 1988

[54] ROTARY HEAD TYPE DIGITAL SIGNAL PLAYBACK

[75] Inventor: Takahiro Kato, Saitama, Japan

[73] Assignee: Pioneer Electronic Corporation, Tokyo, Japan

[21] Appl. No.: 941,121

[22] Filed: Dec. 12, 1986

[30] Foreign Application Priority Data

Dec. 13, 1985 [JP] Japan .................................. 60-280487

[51] Int. Cl.$^4$ .......................... G11B 5/02; G11B 15/02
[52] U.S. Cl. ...................................... 360/72.2; 360/73; 360/21
[58] Field of Search ...................... 360/72.2, 21, 55, 73

[56] References Cited

U.S. PATENT DOCUMENTS 4,533,963  8/1985  Nakano et al. ........................ 360/21

Primary Examiner—Robert S. Tupper
Attorney, Agent, or Firm—Sughrue, Mion, Zinn, Macpeak & Seas

[57] ABSTRACT

A rotary head playback for a tape recorded with slanted tracks, each containing many blocks with recorded block addresses. The rotary head is rotated at twice the normal speed so that it scans in a direction inclined to the tracks and scans across multiple tracks per pass, i.e., one track is scanned in multiple passes. The blocks are stored in a memory according to read block addresses. The memory is read in a given sequence of block addresses.

6 Claims, 3 Drawing Sheets

ROTARY HEAD TYPE DIGITAL SIGNAL PLAYBACK

BACKGROUND OF THE INVENTION

1. Field of the Invention

This invention relates to a rotary head type digital signal playback for regenerating, for example, video and audio signals recorded in a digital form.

2. Background of the Invention

There is known a device for regenerating video and audio signals recorded on a magnetic tape in a digital form using rotary heads. In this case, the rotary heads having different azimuth angles are generally used to record signals on tracks adjacent to each other so that crosstalk caused by interference with one another can be removed at the time of playback even if one track is provided closely adjacent to another for high-density recording purposes.

Normally, two rotary heads having different azimuth angles are fitted to a drum, the two rotary heads being installed 180° apart from each other. The two heads are used to alternately form diagonal magnetic tracks on a magnetic tape for recording signals.

In consequence, the signal will not be regenerated unless the rotary head properly scan the track along the azimuth angle at the time of playback.

Referring to the accompanying drawings, the above fundamental fact will be described. FIG. 1 is a diagram showing magnetic tracks recorded on a magnetic tape 1 with the movements (loci) of the magnetic heads over the traveling tape 1. The magnetic tracks $T_a$ and $T_b$ having different azimuth angles are recorded on the magnetic tape 1 alternately without guard bands. In FIG. 1, a and b designate the two azimuth angles of the recorded track $T_a$ and $T_b$.

Assume that the magnetic tape 1 is played back using two rotary heads fitted to the rotary drum and having the different azimuth angles and also assume that, as shown in FIG. 1, the two rotary heads scan the magnetic tape in a direction different from that of the tracks $T_a$ and $T_b$ recorded thereon because of the malfunction of the travel mechanism. There results different scanning loci 2 and 3. A and B represent the azimuth angle of each head with A=a and B=b.

In the above situation, each of the two rotary heads is capable of regenerating a signal from only the magnetic track portion conforming to the proper azimuth angle, i.e., the portion having slanted lines. In other words, there is a portion left unread on each magnetic track and, as that portion left unread increases, error correction in the digital signal playback system and consequently complete playback become impossible. In this case, digital audio signals are seriously affected thereby.

For the above reasons, it is absolutely necessary to accurately regulate tape travel, precisely machine the drum and thoroughly adjust the head positions in order to prevent the scanning directions from shifting even in the case of a conventional device for use in playback only.

However, it is quite troublesome regulating tape travel, precisely machining the drum and adjusting the head positions. In addition, such arrangements have caused an increase in cost.

SUMMARY OF THE INVENTION

It is therefore an object of the present invention to provide a rotary head type digital signal playback fully capable of regenerating signals in case scanning directions are shifted, i.e., without regulating tape travel, precisely machining a drum and adjusting head positions.

The rotary head type digital signal playback according to the present invention is so arranged that, when digital signals recorded on a plurality of diagonal tracks of a recording medium with frame and block addresses added thereto are regenerated (each frame equivalent to a fixed time length being divided into a plurality of blocks), the signals regenerated by rotary heads are written to a memory in accordance with the frame and block addresses and read out of the memory on a block basis to obtain the regenerated digital signals. The invention is characterized in that one diagonal track is scanned a plurality of times by the rotary head to allow the signal to be regenerated even if the angle at which the rotary head scan the track differs from the angle of inclination of the diagonal recording track.

When the number of rotations of the rotary head (the speed thereof) is set greater than that at the time of recording, the scanning pitch of the rotary head in the longitudinal direction of the tape becomes lower than the recorded track pitch, whereby one and the same rotary head is allowed to repeatedly scan the same track a plurality of times.

When a data signal is recorded in a digital form, the signal is recorded so that each frame equivalent to a fixed time length is divided into a plurality of blocks, with a frame address added to each frame and a block address added to each block. This data is recorded on the tape so that each track contains multiple blocks, each with its own address. It is therefore possible to write data equivalent to one frame to a memory even though the data is written to the memory in random order, provided the frame and block addresses can be identified on a block basis. Accordingly, the rotary head is caused to repeatedly scan the same track a plurality of times and, even if its scanning direction is shifted from the track, the block data left unread during an initial scanning can be read during subsequent scanning. Data equivalent to one frame can thus be regenerated by storing the block data in the memory according to its address. That is, signals can be regenerated.

DETAILED DESCRIPTION OF THE INVENTION

An embodiment of the present invention applied to a rotary head type digital audio tape recorder (RDAT) will subsequently be described.

In the case of the RDAT, data recorded on the track is formed of 196 blocks and its PCM data form 128 blocks. Each PCM block is provided with a block address and 128 blocks on one track can be identified by their addresses. One frame occupies two tracks, two tracks adjacent to each other having different azimuth angles. Moreover, one frame address with the two-track unit, is supplied once every two blocks in the PCM portion. More specifically, 16 different values of addresses ranging from 0 to 15 are given sequentially in a period of 16 frames i.e., with a period of 32 tracks.

Based on the above RDAT format, this embodiments will be described further.

Figure 1:
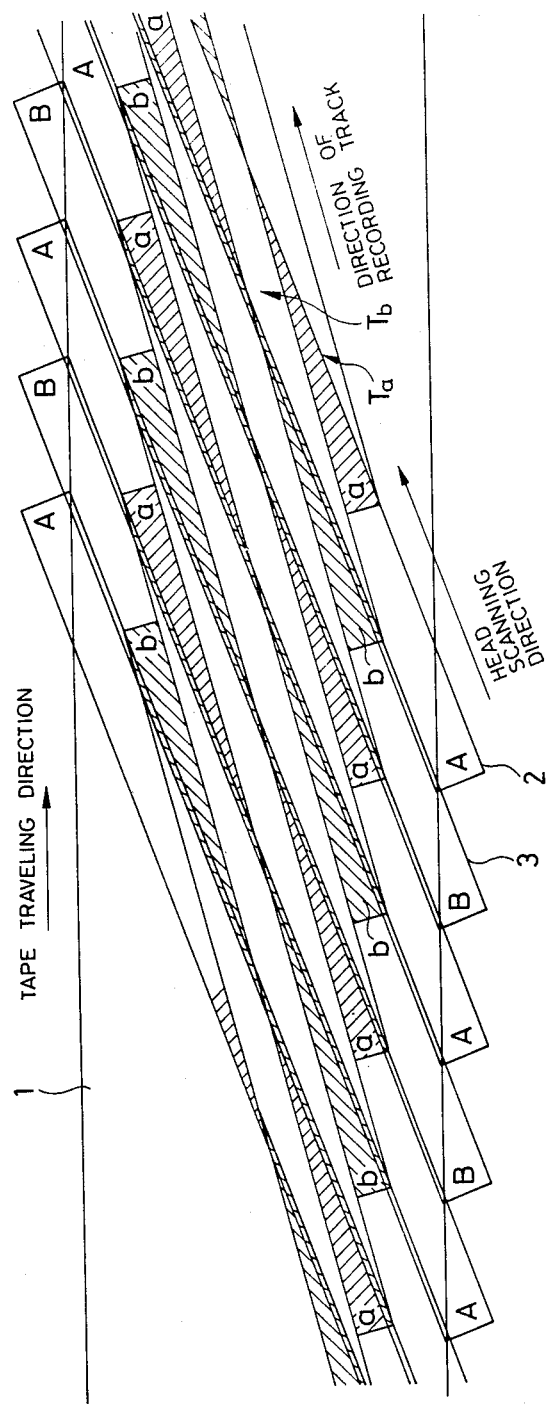
FIG. 1 is a diagram showing recording tracks being scanned by the rotary heads.
Figure 2:
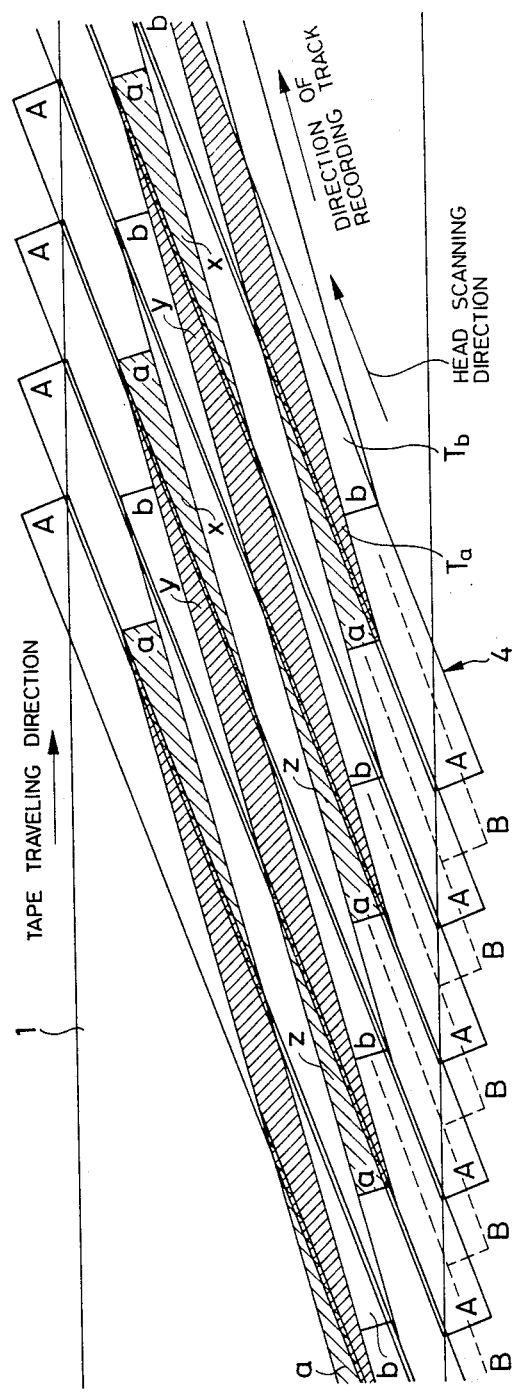
FIG. 2 is a diagram illustrating the operation of a rotary head type digital signal playback according to the present invention.

In FIG. 2 during reading, a magnetic tape 1 is made to travel at the same speed as the tape speed at the time of recording in the direction of an arrow. On the magnetic tape 1 are alternately formed recording tracks $T_a$ and $T_b$ having different azimuth angles as in the case of FIG. 1.

A rotary head drum in this example of reading is rotated at the speed twice as high as the head speed at the time of recording and the scanning locus 4 of FIG. 1 is that of a head HA having an azimuth angle of A. The scanning locus of a head HB having an azimuth angle of B is represented by a dotted line and located in the middle of the scanning locus 4 of the head HA having the azimuth angle of A. In other words, if the number of revolutions is doubled, the scanning pitch of the head in the long direction of the tape becomes ½ of the pitch when the number of revolutions is equal to that at the time of recording. Similarly, if the number of revolutions is increased n times, the pitch is seen to be reduced to 1/n.

Since the portion of the head HA which is usable for playback conforms to a track portion whose azimuth is equal to that of the head HA, that track portion correspond to what is marked with slanted lines in FIG. 2. As is obvious from FIG. 2, the head HA with the azimuth a has been caused to pass over the whole portion of the track $T_a$ with the same azimuth a. However, if attention is concentrated on a certain track $T_a$, the head HA is caused to pass on the track three times, i.e., the drum is rotated three times to completely play back the track $T_a$. In this case, the playback is carried out in order of x-y-z, which does not conform to the order at the time of recording.

Since the digital data on one track is divided into the plurality of blocks as set forth above with the frame and block addresses added to the digital data, signals being regenerated can be rearranged in order of the frame and block addresses by writing them to the memory on a block basis according to the addresses.

Even if the angle of inclination of scanning by the head differs from that of inclination of the recording head as shown in FIG. 2, the digital signals can be regenerated in the same manner as that when both of them properly mate with each other.

In case data are overlapped before being regenerated, they may be detected by means of the frame and block addresses and ignored.

When a portion cannot be played back because the head is not caused to pass over that portion, the number of revolutions of the drum should be increased.

Desired signals regenerated may also be selected by increasing the number of revolutions of the drum to intentionally read overlapped data to increase playback reliability.

The relation between the head HB and the track $T_b$ is entirely the same and one track can completely be played back even though the scanning direction is shifted from the track.

Figure 3:
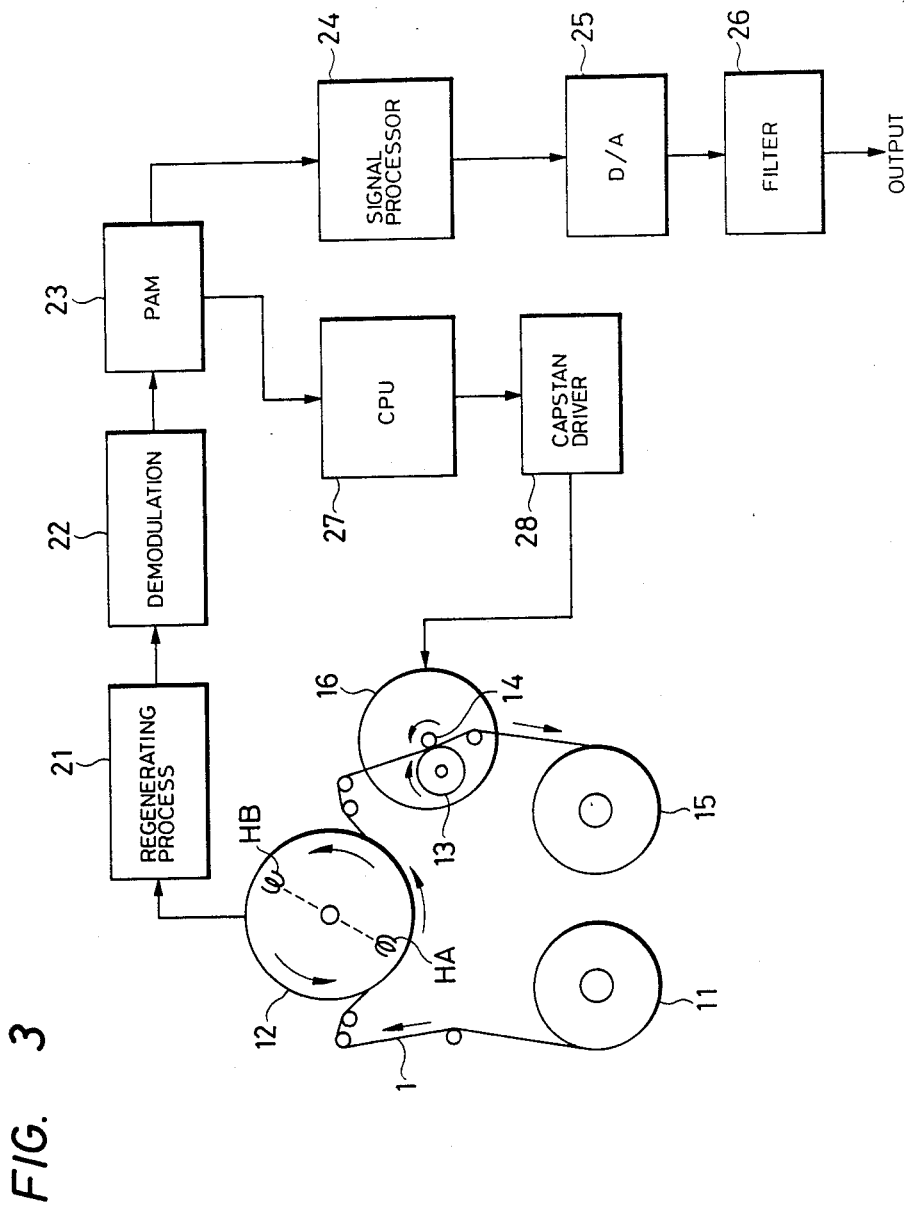
FIG. 3 is a block diagram of an embodiment of the present invention.

FIG. 3 is a block diagram of an example of the playback according to the present invention.

The tape 1 is drawn out of a supply reel 11, would diagonally on a drum 12 over an angle of 90°, passed between a pinch roller 13 and a capstan shaft 14 and wound up on a take-up reel 15.

A digital signal regenerated by rotary heads HA and HB is supplied to a demodulator circuit 22 for demodulation through a playback process circuit 21 consisting of an RF amplifier, an equalizer and a PLL (phase-locked loop). The data thus demodulated is written to predetermined locations of a RAM 23 according to the frame and block addresses of the regenerated signal. This storage by frame and block address returns the data back to the original order. The data thus returned back to the original order in the RAM 23 is read out in the normal sequence of frame and block addresses and sent to a signal processing means 24 where any errors are corrected and it is deinterleaved. The data is then converted into the original analog audio signal through a D/A converter 25 and a low-pass filter 26.

The data is read out of the RAM 23 in this playback at a fixed speed synchronously with clock pulse timing having crystal quartz precision. On the other hand, the data is written to the RAM 23 at a speed corresponding to the speed of the playback tape. The higher the speed of the tape, the higher the input speed, whereas the lower the speed of the tape, the lower the writing speed. Accordingly, the speed of the tape must be kept constant to prevent the RAM 23 form being overloaded or emptied.

Consideration has been given to the above problems in the case of the example of FIG. 3. In FIG. 3, the quantity of data stored in the RAM 23 at present is approximated from the difference between the frame and block addresses of the data sent out of the RAM 23 and those of the data written into the RAM 23.

The address value is therefore supplied by the RAM 23 to a CPU 27 to compute the difference between the addresses. A capstan driver 28 is controlled by the CPU 27 depending on the difference resulting from the above operation and the output of the capstan driver 28 is used to control a capstan shaft driving motor 16 and the speed of the tape.

When the difference between the addresses becomes greater than a prdetermined value, i.e., when the quantity of the data in the RAM 23 increases, the speed of the capstan shaft driving motor 16 is decreased to a fixed degree, whereas the speed of the capstan shaft driving motor 16 is increased to a fixed degree when the quantity of the data therein becomes lower than a predetermined level.

The RAM 23 is thus prevented from overflowing or being emptied.

When the quantity of the data in the RAM 23 is maintained at the proper value, the tape feed should be so controlled as to keep the speed of the capstan shaft driving motor at a normal value.

Playback thus becomes possible even if a tracking control circuit normally installed in the RDAT is omitted.

As set forth above, one diagonal track is scanned a plurality of times by setting the travel speed of the rotary heads higher than that at the time of recording. However, the above operation is also possible through other arrangements.

For instance, when data is recorded by winding a magnetic tape over 180° of a drum 15 mm in diameter equipped with one double-gap (±azimuth) head, by rotating the drum at 4,000 rpm and by causing recording current to flow in alternate directions through the double gap, a recording pattern formed at this time is similar to the pattern obtained by winding a magnetic tape over 90° of a drum 30 mm in diameter equipped with two heads and rotating the drum at 2,000 rpm. Consequently, when data is regenerated by winding the magnetic tape over 90° of the drum 30 mm in diameter equipped with the two heads, the number of revolutions should be set at 4,000 rpm. If four playback heads ($A_1$ - $B_1$ - $A_2$ - $B_2$) are used for a drum 30 mm in diameter with a 90°-wound tape, the number of revolutions should be set as 2,000 rpm.

As set forth above, playback is possible by setting the number of revolutions of the rotary head greater than that at the time of recording even though head locus is shifted from the recording track. In the case of a device for use in playback only, it may become possible to dispense with tape travel adjustment, omit a drum leading means, dispense with head position adjustment and reduce the cost of the mechanism by a large margin. The rotational accuracy of drum and capstan motors may be lowered, whereas a drum having a different lead angle (e.g., 8 mm VTR) may be used for playback.

What is claimed is:

1. A rotary-head digital signal play back for a tape recorded with slanted tracks divided into blocks of data, at least some of said blocks having recorded therein block addresses and frame addresses, a plurality of blocks forming a frame equivalent to a fixed time length, said play back comprising:
    rotary-head scanning means for scanning each of said slanted tracks a plurality of times to produce a read signal;
    means for regenerating from said read signal said blocks of data, said block addresses and said frame addresses in digital form;
    a memory;
    means for storing said regenerated blocks of data in locations of said memory determined by at least said regenerated block addresses; and
    means for reading said blocks of data from locations of said memory determined by a predetermined sequence of said block addresses.

2. A playback as recited in claim 1, wherein said rotary-head scanning means scans said tracks in a direction inclined to said tracks and scans a plurality of tracks in one scan across said tape.

3. A playback as recited in claim 1:
    wherein said storing means stores said blocks of data in locations of said memory determined by a current pair of said regenerated block and frame addresses; and
    wherein said reading means reads said blocks of data from locations determined by a current pair of a predetermined sequence of said block and frame addresses.

4. A playback as recited in claim 1, further comprising:
    means for determining a difference between said current pair of said regenerated block and frame addresses and said current pair of said predetermined sequence of said block and frame addresses;
    means for moving said tape past said rotary-head scanning means at a speed;
    means for adjusting said speed in accordance with said difference.

5. A method of reading a tape, comprising the steps of:
    scanning with a rotary head a tape recorded with slanted tracks divided into blocks of data, at least some of said blocks having recorded therein block addresses and frame addresses, a plurality of blocks forming a frame equivalent to a fixed frame length, wherein said scanning step scans each of said tracks a plurality of times to produce a read signal;
    regenerating from said read signal said blocks of data, said block addresses and said frame addresses in digital form;
    storing said regenerated blocks of data in locations of a memory determined by said regenerated frame and block addresses; and
    reading said blocks of data from locations of said memory determined by a predetermined sequence of said block and frame addresses.

6. A method as recited in claim 5, further comprising the steps of:
    determining a difference between a current value of said regenerated block and frame addresses and a current value of said sequence of block and frame addresses; and
    adjusting a travel speed of said tape past said rotary head in response to said determined difference.

* * * * *